3,152,081
FOAM INHIBITED COMPOSITION

Elwin B. Ovist, Park Forest, and John Podlipnik, Palos Heights, Ill., assignors, by mesne assignments, to Sinclair Research Inc., New York, N.Y., a corporation of Delaware
No Drawing. Filed July 14, 1960, Ser. No. 42,765
7 Claims. (Cl. 252—57)

This invention relates to petroleum derived compositions having improved anti-foaming characteristics.

The formation of foam is distinctly disadvantageous under many circumstances, as, for example, in wax coating compositions and also in lubricating oils, for instance used in internal combustion engines. Foaming leads to bubbled coatings or ineffective lubrication of bearing parts.

The compositions of the present invention overcome these problems by providing a petroleum-derived base having a plurality of additive components which afford a superior product of anti-foaming characteristics. The compositions of this invention have a major amount of petroleum-derived material such as petroleum lubricating oil or wax and a minor amount of a copolymer of an ester of a vinyl carboxylic acid wherein the ester group is a branched chain aliphatic hydrocarbon radical of from 5 to 10 carbon atoms and styrene which are polymerized in the presence of a small amount of an aldehyde. The preferred copolymers of this invention are prepared from 2-ethylhexyl acrylate or di-2-ethylhexyl fumarate, styrene and the aldehyde. The copolymer contains about 10 to 50 parts by weight of the ester and about 0.25 to 5 parts by weight of the aldehyde per part of styrene. We prefer about 35 to 45 parts by weight of an acrylate or about 12 to 18 parts by weight of a di-fumarate. The acrylate and di-fumarate are not both used in preparing a given copolymer. The copolymers are normally present in the petroleum-derived compositions of this invention in minor amounts sufficient to afford anti-foaming characteristics, for instance about .001 to 0.2 percent by weight of the final composition, preferably in amounts of about .005 to 0.2 or even about 0.05 to 0.2 percent by weight.

The acids which are utilized in the preparation of the esters include the vinyl mono- and di-carboxylic acids, i.e., having unsaturation in the 2 position, of 3 to 4 carbon atoms. The alcohols have from 5 to 10 carbon atoms. Particularly desirable alcohols are the branched chain aliphatic alcohols such as 2-ethyl hexanol. It is generally preferred to employ styrene but if desired, styrene derivatives such as alkyl side chain or ring substituted materials, e.g., alphamethyl styrene, and the like, may be employed.

The aldehyde which is present essentially at the beginning of the polymerization process is employed as a polymerization initiator and terminator. The aldehyde selected is normally a matter of availability and economics and will generally be an aldehyde of up to 12 carbon atoms or more. The preferred aldehydes are those of 2 to 10 carbon atoms such as benzyl aldehyde and butyl aldehyde or other alkanals.

The copolymers may be formed by conventional free radical initiated polymerization. Suitable catalysts which promote free radical polymerization may be employed such as oxygen and peroxides, including acyl peroxides, alkyl peroxides, alkyl percarboxylates, alkyl hydroperoxides, azines, aliphatic azo compounds, persulfates, perborates, hydrogen peroxide and like materials commonly used to initiate addition polymerizations, see U.S. Patent No. 2,572,951. Polymerization can be carried out batchwise, semicontinuously or continuously in solution systems using an organic liquid solvent such as benzene, toluene, xylene, cyclohexane, cyclohexanone, or high boiling petroleum fractions. The copolymers may be formed by heating a solution of the ester, styrene and aldehyde with the selected free radical catalyst such as benzoyl peroxide. In general, the polymerization is conducted at a temperature of from about room temperature to 150° C. or more. After the desired degree of polymerization has occurred the resulting polymer can be isolated by conventional methods. Preferably, the polymerization will be carried out at elevated temperatures of about 50 to 100° C. for extended periods of time such as at least about 4 hours up to about 12 hours or longer. It is often advantageous to conduct the polymerization in the presence of an inert gas such as nitrogen. The degree of polymerization depends upon the individual ester employed. In view of the effect of the reaction conditions and the nature of the reactants upon the extent of polymerization it is recommended that for each initial run, the desired operating conditions be determined, but in any event, the copolymer is soluble or dispersible in the base petroleum hydrocarbon.

The petroleum-derived constituents which are the major components of our products may be oils of lubricating viscosity or a petroleum wax such as paraffin waxes and microcrystalline waxes. Also if desired, polyethylene may be included in the wax compositions.

The hydrocarbon oil used in the present invention is of lubricating viscosity normally not exceeding about 250 S.U.S. at 210° F. and can be for instance a solvent extracted or solvent refined oil obtained in accordance with conventional methods of solvent refining lubricating oils. Preferably the lubricating oil has a viscosity from about 20 to 150 S.U.S. at 210° F. and may be derived from paraffinic, naphthenic, asphaltic or mixed base crudes, and if desired, a blend of solvent-treated Mid-Continent neutrals and Mid-Continent bright stocks may be employed. A particularly suitable base oil used in the preparation of the compositions described hereinafter is a solvent treated Mid-Continent neutral having a viscosity index of about 95.

By paraffin or paraffin wax, we mean crystalline petroleum products which are removed from distillates or overhead stocks by sweating or solvent separation. These waxes ordinarily have a melting point in the range of about 115° to 150° F. Paraffin waxes are generally agreed to have a plate-like crystalline structure. They are relatively hard, brittle and fairly easily fractured. Paraffin wax is generally obtained from the wax-containing oil distillate fraction, and is separated by oil-removal methods, such as chilling and subsequent refining operations (e.g., sweating) to yield the paraffin wax. Paraffin waxes of about 125–129° F. melting point have been found to be particularly suitable in this invention.

Microcrystalline waxes are well known to those in the petroleum art and such products have also been designated as amorphous or petrolatum waxes. The available commercial grades vary somewhat in hardness and melting point. Microcrystalline wax is to be distinguished from paraffin wax which is derived from more volatile and lighter fractions in the distillation of petroleum and is markedly crystalline and brittle compared to microcrystalline wax which is non-brittle.

Polyethylene can be produced by a variety of methods as is well known to those skilled in the art. For example, a high temperature and pressure method of preparing high molecular weight ethylene polymers is described in detail in U.S. No. 2,153,553 issued to E. W. Fawcett et al., on April 11, 1939. Polyethylene is thermoplastic at temperatures above 130° C., and is quite tough although relatively inelastic. Polyethylene is odorless, tasteless, nontoxic, translucent, white in color and resembles paraffin wax in appearance and texture. Polyethylene polymers vary in weight but for most purposes polymers having molecular weights of about 2,000 to 21,000 have been found most suitable, although molecular weights outside of this range can be employed. Polyethylene having a terminal hydroxy group and of approximately 2,100 molecular weight has been found to be particularly useful in this invention.

The wax compositions can be applied to paperboard containers which are dipped into a melt of the wax, for instance, maintained at a temperature of about 155 to 190° F. The coated containers are withdrawn from the vat of melted wax and then cooled by contact with a flowing gas stream, e.g., such as air, preferably at a temperature of about 40 to 60° F. Paperboard presently employed in the packaging industry such as sized and calendered paperboard produced by the Fourdrinier process and having a low moisture content, i.e., about 5%, can be used as the base material for the wax coating.

The following examples serve to illustrate this invention without limiting its scope.

EXAMPLE I 78 grams of 2-ethylhexyl acrylate is mixed with 5 g. of normal butyraldehyde and 2 g. of styrene in a screwtop bottle. The mixture is then heated to about 60° C. and .2 g. of benzyl peroxide is dissolved in the mixture. The capped bottle is then stored in an 80° C. oven for a period of about 12 hours and then the mixture is topped to 150° F. at 5 mm. Hg pressure. The resulting polymer is then added in an amount of 0.05% to a wax composition having the following components.

(1) 83 weight percent of a crystalline paraffin wax:

| | |
|---|---|
| Gravity, ° API | 42.2 |
| ASTM M.P., ° F. | 126.1 |
| Viscosity, cs./175° F. | 4.675 |
| Percent oil | .17 |
| Penetration at— | |
| 77° F. | 19 |
| 90° F. | 41 |
| 100° F. | 100 |
| Tensile strength at 73° F., p.s.i. | 316 |
| Refractive index at 70° F. | 1.4317 |

(2) 15 weight percent of a soft microcrystalline wax having the following physical characteristics:

| | |
|---|---|
| Gravity, ° API | 32.6 |
| Petrolatum M.P., ° F. | 156 |
| Viscosity, cs./210° F. | 17.1 |
| Percent oil | 0.6 |
| Penetration at 77° F. | 68 |
| Refractive index at 70° F. | 1.45785 |

(3) 2 weight percent of a terminal OH-polyethylene having a molecular weight of 2,100.

EXAMPLE II

The reaction product polymer of Example I is added to a 95 V.I. petroleum lubricating oil having a viscosity at 100° F. of about 150 SUS, in an amount of about 0.05%.

EXAMPLE III 30 g. of di-2-ethylhexyl fumarate are mixed with 2 g. of styrene and 1.0 g. of n-butyraldehyde in a 100 mm. round-bottomed flask equipped with a thermometer, nitrogen inlet tube and reflux condenser. The air is displaced by nitrogen and then .2 g. of benzoyl peroxide is added to the reaction mixture. The temperature is then raised to 80° C. and maintained for a period of 6 hours. The reaction product is topped to 150° C. at 5 mm. Hg pressure. The reaction product is mixed with a wax composition as in Example I.

EXAMPLE IV

The reaction product of Example III is added to a mineral lubricating oil as in Example II.

A series of tests which make up Table I were conducted to show the utilization of the various compositions of this invention as foam inhibitors. The evaluations are made in a wax foam test which correlates the results obtained when using a wax with and without foam inhibitor when operating milk carton coating machines. The test procedure consists of placing 15 cc. of test sample into a 15 cc. graduated cylinder which is stoppered with a cork stopper and covered with aluminum foil. The graduated cylinder containing the test sample is placed in an oven at about 175° F. for a period of about at least 30 minutes. The cylinder is removed from the oven and shaken 12 times and placed back into the oven. The times required for the foam to break to the first appearance of the molten wax surface (break-through time); to 3 remaining bubbles on the wax surface; and to complete collapse of all bubbles are recorded. The results are shown in Table I.

*Table I*

| | | Wt. Percent Additive in Base Wax | Average Time in Seconds to— | | |
|---|---|---|---|---|---|
| | | | Break Through | 3 Bubbles | Complete Collapse |
| Base Wax of Example I | | | 43 | 142 | 158 |
| Base Wax Additives | | | | | |
| Wt. Ratio of Reactants | Reactants | | | | |
| 60 | Lauryl Methacrylate | 0.1 | 37 | 122 | 148 |
| 6 | Styrene | 0.01 | 33 | 92 | 109 |
| 3 | Butyraldehyde | 0.001 | 43 | 135 | 176 |
| 60 | Lauryl Methacrylate | 0.1 | 27 | 70 | 120 |
| 3 | Styrene | 0.01 | 71 | 168 | 203 |
| 3 | Butyraldehyde | 0.001 | 126 | 277 | 488 |
| 60 | Lauryl Methacrylate | 0.1 | 29 | 116 | 308 |
| 1.5 | Styrene | 0.01 | 11 | 20 | 49 |
| 3 | Butyraldehyde | 0.001 | 49 | 146 | 238 |
| 60 | Lauryl Methacrylate | 0.1 | 39 | 121 | 155 |
| 6 | Styrene | 0.01 | 46 | 150 | 193 |
| | | 0.001 | 12 | 23 | 29 |
| 68 | Hexyl Methacrylate | 0.1 | 87 | 157 | 191 |
| 30 | n-Butyraldehyde | 0.01 | 75 | 191 | 257 |
| 2 | Styrene | 0.001 | 24 | 145 | 298 |
| 20 | Dioctyl [1] Fumarate | 0.1 | 85 | 169 | 370 |
| 10 | Octyl Acrylate | 0.01 | 164 | 479 | 584 |
| 1 | Butyraldehyde | 0.001 | 141 | 396 | 822 |
| 25 | Dioctyl Fumarate | 0.1 | 13 | 63 | 79 |

*Table I—Continued*

| Base Wax Additives | | Weight Percent Additive in Base Wax | Average Time in Seconds to— | | |
|---|---|---|---|---|---|
| Wt. Ratio of Reactants | Reactants | | Break Through | 3 Bubbles | Complete Collapse |
| 5 | Octyl Acrylate | 0.01 | 12 | 37 | 52 |
| 1 | Butyraldehyde | 0.001 | 87 | 119 | 134 |
| 2 | Styrene | | | | |
| 25 | Dioctyl Fumarate | 0.1 | 15 | 77 | 128 |
| 5 | Octyl Acrylate | 0.05 | 11 | 55 | 75 |
| 1 | Butyraldehyde | 0.01 | 8 | 25 | 29 |
| 4 | Styrene | 0.005 | 14 | 39 | 54 |
| | | 0.001 | 45 | 56 | 67 |
| 20 | Dioctyl Fumarate | 0.1 | 85 | 181 | 247 |
| 10 | Octyl Acrylate | 0.01 | 357 | 591 | 900+ |
| 1 | Butyraldehyde | 0.001 | 141 | 352 | 450 |
| 1 | Styrene | | | | |
| 15 | Dioctyl Fumarate | 0.1 | 280 | 575 | 600+ |
| 15 | Octyl Acrylate | 0.01 | 432 | 840 | 900+ |
| 1 | Butyraldehyde | 0.001 | 134 | 337 | 417 |
| 15 | Dioctyl Fumarate | 0.1 | 22 | 150 | 300 |
| 15 | Hexyl Methacrylate | 0.01 | 18 | 45 | 82 |
| 1 | Butyraldehyde | 0.001 | 23 | 76 | 91 |
| 25 | Dioctyl Fumarate | 0.1 | 32 | 48 | 52 |
| 5 | Lauryl Methacrylate | 0.01 | 78 | 180 | 220 |
| 1 | Butyraldehyde | 0.001 | 27 | 110 | 260 |
| 2 | Styrene | | | | |
| | | 0.1 | 0 | 0 | 0 |
| 30 | Dioctyl Fumarate | 0.05 | 0 | 11 | 11 |
| 1 | Butyraldehyde | 0.01 | 10 | 21 | 22 |
| 2 | Styrene | 0.005 | 20 | 39 | 45 |
| | | 0.001 | 147 | 304 | 413 |
| 20 | Dioctyl Fumarate | 0.1 | 45 | 126 | 162 |
| 10 | Lauryl Methacrylate | 0.01 | 39 | 115 | 181 |
| 1 | Butyraldehyde | 0.001 | 27 | 84 | 102 |
| 2 | Styrene | | | | |
| | | 0.1 | 113 | 271 | 368 |
| 20 | Dioctyl Fumarate | 0.05 | 46 | 265 | 324 |
| 10 | Hexyl Methacrylate | 0.01 | 29 | 76 | 103 |
| 1 | Butyraldehyde | 0.005 | 18 | 43 | 65 |
| | | 0.001 | 19 | 49 | 64 |
| | | 0.1 | 0 | 0 | 0 |
| 78 | Octyl acrylate | 0.05 | 0 | 0 | 0 |
| 5 | n-Butyraldehyde | 0.01 | 0 | 5 | 6 |
| 2 | Styrene | 0.005 | 0 | 6 | 7 |
| | | 0.001 | 4 | 10 | 11 |

[1] Octyl is 2-ethylhexyl in all compositions.

Table I shows clearly that the reaction products of our invention show advantageous defoaming characteristics when utilized in wax compositions.

The polymers of this invention were further tested in a mineral lubricating oil having 95 V.I. and a viscosity of about 150 SUS at 100° F., using the standard ASTM D–892 test procedure for determining foam characteristics of lubricating oils. The results are presented in Table II.

*Table II*

| Wt. Ratio of Reactants | Reactants | Wt. Percent Additive | ASTM D-892 Foam Test Results | | |
|---|---|---|---|---|---|
| | | | Ml. foam after blowing 5 min. at 75° F. | Ml. foam after settling 10 min. at 75° F. | Time in seconds for complete collapse of foam |
| 25 | Base Oil | | 260 | 0 | 113 |
| | Dioctyl Fumarate | 0.05 | 610 | 260 | |
| 5 | Octyl Acrylate | 0.005 | 480 | 0 | 363 |
| 1 | Butyraldehyde | 0.0005 | 170 | 0 | 88 |
| 4 | Styrene | | | | |
| 78 | Octyl[1] Acrylate | 0.05 | 0 | 0 | |
| 5 | n-Butyraldehyde | 0.005 | 105 | 0 | 54 |
| 2 | Styrene | 0.0005 | 340 | 0 | 129 |
| 20 | Dioctyl Fumarate | 0.05 | 320 | 0 | 181 |
| 10 | Hexyl Methacrylate | 0.005 | 360 | 0 | 238 |
| 1 | Butyraldehyde | 0.0005 | 370 | 0 | 123 |
| 30 | Dioctyl Fumarate | 0.05 | 610 | 0 | 512 |
| 1 | Butyraldehyde | 0.005 | 430 | 0 | 268 |
| 2 | Styrene | 0.0005 | 225 | 0 | 126 |

[1] Octyl is 2-ethylhexyl in all compositions.

This table shows clearly that polymers made from 2-ethylhexyl acrylate, n-butyraldehyde and styrene are effective in suppressing foaming in oils of lubricating viscosity when they are present in small concentrations.

We claim:

1. A foam-inhibited composition consisting essentially of a major amount of a petroleum wax and a minor amount sufficient to inhibit foaming of a polymer of an ester of vinyl carboxylic acid selected from the group consisting of fumaric and acrylic acids where the ester group is a branched chain aliphatic hydrocarbon radical of from 5 to 10 carbon atoms and styrene, said polymer being terminated by an aldehyde of 2 to 12 carbon atoms; in a weight ratio of about 35 to 45 parts of ester when it is an acrylate, and about 12 to 18 parts of ester when it is a fumarate, and about 0.25 to 5 parts of aldehyde per part of styrene.

2. The composition of claim 1 where the copolymer is present in amounts of about 0.001 to 0.2 percent by weight of the final composition.

3. The composition of claim 2 where the ester is 2-ethylhexyl acrylate and the aldehyde is n-butyraldehyde in an amount of about 2.5 parts per part of styrene.

4. The composition of claim 2 where the ester is 2-ethylhexyl fumarate and the aldehyde is n-butyraldehyde in an amount of about 0.5 part per part of styrene.

5. A foam-inhibited composition consisting essentially of a major amount of a mineral oil of lubricating viscosity and a minor amount sufficient to inhibit foaming of a copolymer of an ester of acrylic acid where the ester group is a branched chain aliphatic hydrocarbon radical of 5 to 10 carbon atoms and styrene, said polymer being terminated by an aldehyde of 2 to 12 carbon atoms; in a weight ratio of about 35 to 45 parts of the ester and about 0.25 to 5 parts of aldehyde per part of styrene.

6. The composition of claim 5 where the copolymer is present in amounts of about 0.05 to 0.2 percent by weight of the final composition.

7. The composition of claim 6 where the ester is 2-ethylhexyl acrylate and the aldehyde is butyraldehyde in an amount of about 2.5 parts per part of styrene.

References Cited in the file of this patent

UNITED STATES PATENTS

| | | |
|---|---|---|
| 2,570,788 | Giammaria | Oct. 9, 1951 |
| 2,653,911 | Fields et al. | Sept. 29, 1953 |
| 2,796,355 | Higgins | June 18, 1957 |
| 2,978,395 | Hollyday et al. | Apr. 4, 1961 |
| 2,984,691 | Fotis | May 16, 1961 |

FOREIGN PATENTS

| | | |
|---|---|---|
| 498,890 | Canada | Dec. 29, 1953 |